May 1, 1945.    L. A. KISCH ET AL    2,374,756
STRAINER BODY AND HARNESS THEREFOR
Filed Feb. 11, 1944    2 Sheets-Sheet 1

INVENTORS:
Louis A. Kisch & Edward J. Herter, Jr.,
BY George D. Richards
ATTORNEY.

May 1, 1945.  L. A. KISCH ET AL  2,374,756
STRAINER BODY AND HARNESS THEREFOR
Filed Feb. 11, 1944  2 Sheets-Sheet 2

INVENTORS:
Louis A. Kisch & Edward J. Herter, Jr.,
BY George D. Richards
ATTORNEY.

Patented May 1, 1945

2,374,756

UNITED STATES PATENT OFFICE 2,374,756

STRAINER BODY AND HARNESS THEREFOR

Louis A. Kisch, Little Falls, and Edward J. Herter, Jr., Ridgewood, N. J., assignors to Metal Textile Corporation, West Orange, N. J., a corporation of Delaware Application February 11, 1944, Serial No. 521,946

2 Claims. (Cl. 210—170)

This invention relates to strainer means for separating suspended solids from liquid passed therethrough, whereby to clarify and cleanse the liquid for initial or repeated use; and the invention has reference, more particularly, to a novel strainer body and suspension harness therefor, whereby the strainer body may be detachably assembled with and in operative relation to a clean liquid discharge conduit leading from a supply reservoir from which the liquid to be strained is to be drawn.

This invention has for an object to provide in combination with a foraminous strainer body adapted to be submerged in liquid desired to be passed therethrough, said strainer body having an axial discharge passage, a novel harness means for suspending said strainer body from a liquid discharge conduit with the strainer discharge passage in communication therewith, and said harness means being manipulatable to release said strainer body for removal therefrom, and from assembled relation to said discharge conduit, for cleaning and for replacement.

The invention has for another object to provide a strainer body supporting harness having means for affixing the same to the intake end portion of a clean liquid discharge conduit, and releasable means for both closing the lower end of said strainer body discharge passage and for supporting said strainer body with its discharge passage in communication with the intake end of said clean liquid discharge conduit.

Other objects of this invention, not at this time more particularly enumerated, will be understood from the following detailed description of the same.

An illustrative embodiment of this invention is shown in the accompanying drawings, in which.

Similar characters of reference are employed in the above described views, to indicate corresponding parts.

Figure 1:
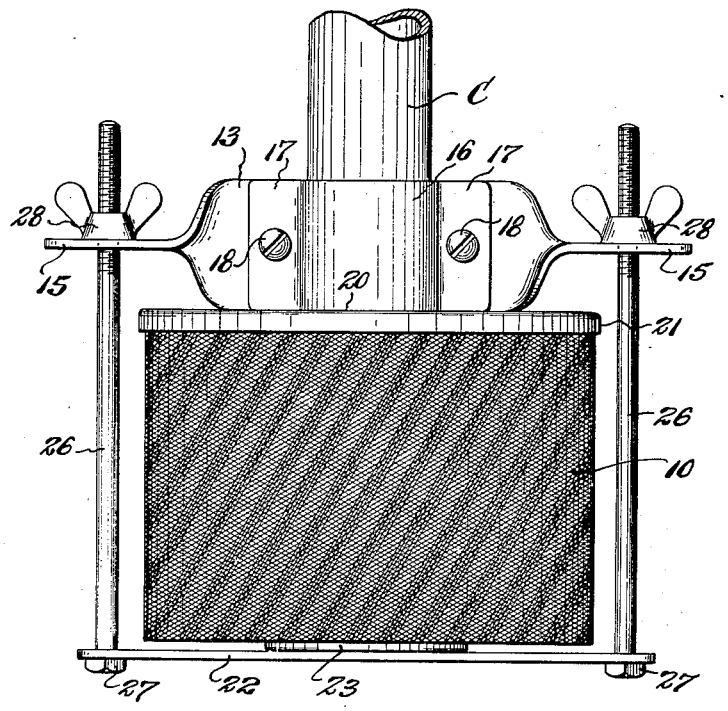
Fig. 1 is an elevational view of a strainer body and its supporting harness as operatively assembled and attached to the intake end portion of a clean liquid discharge conduit.
Figure 2:
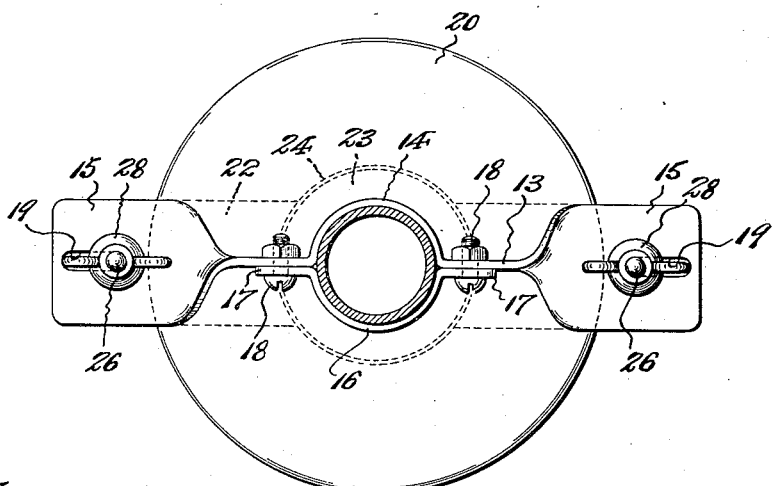
Fig. 2 is a top plan view of the harness supported strainer body, the discharge conduit being shown in cross section.

Referring to the drawings, the reference character 10 indicates a foraminous strainer body, preferably of cylindrical form and provided with an axial discharge passage 11. Said strainer body may be selectively made of various materials adapted to provide the necessary liquid pervious interstitial mass suitable for liquid straining effect.

In a suitable form thereof, the strainer body is formed from a knitted mesh fabric, knitted from a metallic wire strand, vegetable or other non-metallic strands, or from selected combinations of such strands. Preferably the fabric is provided by a knitted mesh in strip or sheet form of suitable width. Single or superposed strips or sheets of such knitted mesh fabric are rolled into an annular body formation of desired internal and external diameters, thus providing the axial discharge passage 11; the height of said body being determined by the width of the fabric. The axial discharge passage of the body thus formed is surrounded by a foraminous or porous wall of desired thickness which is pervious to flow of liquid therethrough, and yet adapted to arrest movement of any suspended solids contained in the liquid, whereby to separate said solids from the liquid, and thus deliver clean liquid only into the axial discharge passage 11 of the strainer body.

In a preferred form of strainer body of the kind generally characterized as above set forth, the same is formed from tubular knit metallic or composite metallic mesh fabric, which is first flattened into strip or sheet form, and is then corrugated or crimped so that the corrugations extend obliquely across the width of the strip or sheet from one longitudinal edge thereof to the other. A plurality of corrugate strips or sheets of the knitted metallic or composite metallic mesh fabric are superposed in such manner that the corrugations of one are disposed to cross those of another contiguous thereto. After the corrugate strips or sheets are thus related, the same are rolled into an annular body as before stated, thus providing the required foraminous or interstitial body mass. In order to support the interior of the body mass against displacement or collapse into its required axial discharge passage 11, an internal tubular supporting wall 12 of perforate material is provided. Such wall 12 bounds the discharge passage 11, and a satisfactory form thereof may comprise a tubular member made of rigidulous square woven mesh. In such preferred form of strainer body, the interstices will be substantially uniformly distributed throughout the body mass, and the interstices may be optionally modified in size by using a knitted fabric of suitably selected mesh size, and by forming therein corrugations of selected size and depth, all whereby a porous or interstitial body mass of desired density may be readily obtained.

The harness for supporting the strainer body 10 and releasably coupling the same in communication with a clean liquid discharge conduit C, in an illustrative embodiment thereof as shown, comprises a cross-head having a central yoke means to embrace the intake end portion of said conduit C in such manner as to affix said cross-head thereto. Said cross-head comprises an intermediate portion 13 disposed in perpendicular plane, the central part of which is outwardly bowed to provide a substantially semi-circular yoke portion 14, sized to embrace said conduit C. The outer end portions of said cross-head are twisted to dispose the same in planes substantially at right angles to the perpendicular plane of its intermediate portion 13, thus providing, at the respective outer end portions of said cross-head, oppositely extending horizontal hanger arm portions 15. Cooperative with said intermediate portion 13 of the cross-head is a substantially semi-circular yoke cap 16 having oppositely extending lateral foot flanges 17. Said yoke cap 16 is adapted to be applied around the exposed side of the yoke embraced conduit C, and so as to oppose its foot flanges 17 to the face of the intermediate portion 13 of the cross-head, thereupon to be fastened to the latter by bolts 18, whereby to clamp the cross-head in operative affixed relation to the intake end portion of the conduit C. Said hanger arm portions 15 are provided with longitudinal slots 19.

Arranged beneath the cross-head is an annular seating plate 20, adapted to be engaged over the extremity of the conduit C so as to abut the underside of said cross-head. Said seating plate 20 substantially corresponds in diameter to the external diameter of the strainer body 10, and is provided around its external periphery with a dependent peripheral flange 21 to embrace the upper end of said strainer body 10, when the latter is abutted against the underside of said seating plate in operative assembled relation thereto and to the conduit C, and so that the axial discharge passage 11 of the strainer body 10 is disposed in axially aligned communicating relation to said conduit C.

Adapted to engage diametrically across the lower end of said strainer body 10, when the latter is assembled in communicating relation to the conduit C, is a clamp bar 22 of suitable width, and of a length exceeding the diameter of the strainer body, so that free ends thereof extend oppositely beyond the sides of the latter. Mounted on the upper face of said clamp bar 22 intermediate its ends is a closure member 23 of a diameter exceeding the diameter of the axial discharge passage 11 of said strainer body 10. Said closure member 23 is provided with an upstanding peripheral flange 24. The free end portions of said clamp bar 22 are provided with openings 25. Extending upwardly through said openings 25 are tie-rods 26 having heads 27 stopped against the underside of the clamp bar 22, whereby to support the latter. The upper free end portions of said tie-rods 26 pass upwardly through the slots 19 of the cross-head hanger arm portions 15, and said end portions of the tie-rods are screw-threaded to receive nuts 28, which, preferably, are of the wing or thumb nut type.

When the strainer body 10 is applied to the seating plate 20 with its axial discharge passage 11 in communication with the discharge conduit C, the clamp bar 22 is applied across the bottom end of said strainer body 10 with the closure member 23 aligned with the lower open end of said strainer body discharge passage 11. The tie-rods 26 are thereupon swung inwardly to the inner ends of the slots 19 of the cross-head hanger arm portions 15, and the nuts 28 are then screwed home on the tie-rods to abut said hanger arm portions 15. As the nuts 28 are tightened, the tie-rods 26 will be drawn upwardly so as to carry therewith the clamp bar 22 and closure member 23 against the underside of the strainer body 10. As the clamp bar is thus drawn home in supporting relation to the strainer body 10, it will force the upstanding peripheral flange 24 of the closure member 23 into the mass of the strainer body at points adjacent to and surrounding the axial discharge passage 11 of the latter, thus disposing the closure member 23 in closed relation to the lower end of said passage. The penetration of the strainer body mass by the peripheral flange 24 of said closure member 23 acts to form a close joint or seal between the periphery of the closure member 23 and the strainer body, so that no liquid having a suspended solid content can enter the strainer body discharge passage until after it has traversed the mass of the latter, whereby said solid content is excluded and separated from the liquid.

The upthrust of the clamp bar 22 and closure member 23 will firmly hold the upper end of the strainer body 10 abutted against the seating plate 20, so as to likewise form a joint adequate to exclude solids, while at the same time the strainer body 10 is securely supported against displacement from operative assembled relation to the clean liquid discharge conduit C.

Figure 3:
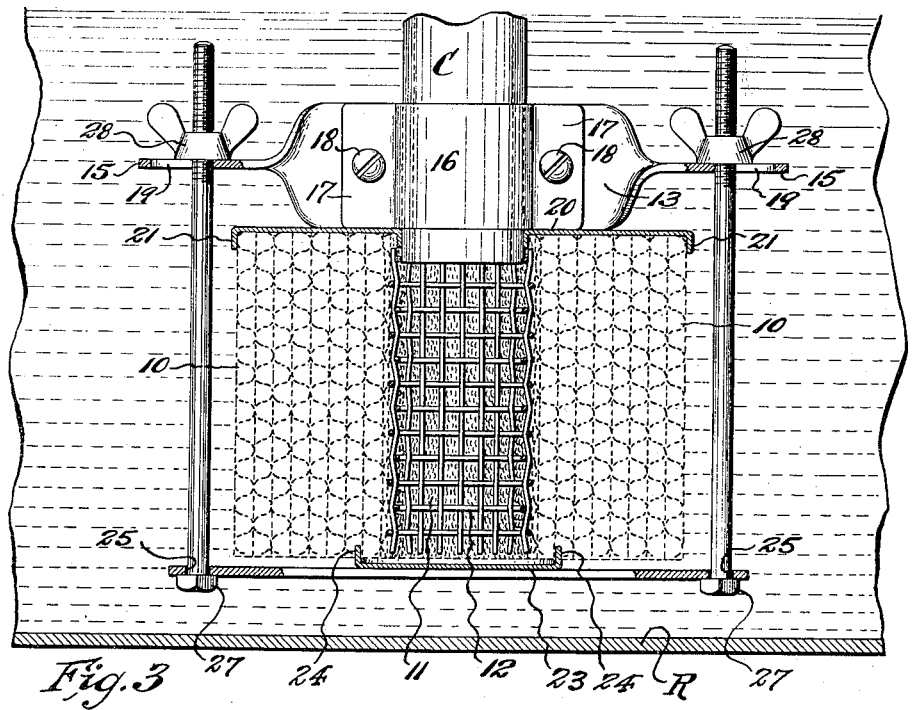
Fig. 3 is a vertical sectional view of the same, with parts shown in elevation, and as operatively submerged in a liquid supply reservoir.

The intake end of the clean liquid discharge conduit C, with the strainer body 10 assembled therewith as stated, is adapted to be submerged in the content of a liquid supply reservoir R from which liquid desired to be strained is to be withdrawn (see Fig. 3). Any suitable means for inducing outward flow of liquid through the discharge conduit C may be employed, such e. g. as a pump. As such outward flow of liquid is induced, the liquid from the reservoir R is compelled to pass through the interstitial mass of the strainer body 10 and thence into the discharge passage 11 of the latter, from whence it is drawn by the discharge conduit C. In traversing the interstitial mass of the strainer body 10, any solids suspended in the liquid are arrested by the latter, and thus separated from the liquid.

Figure 4:
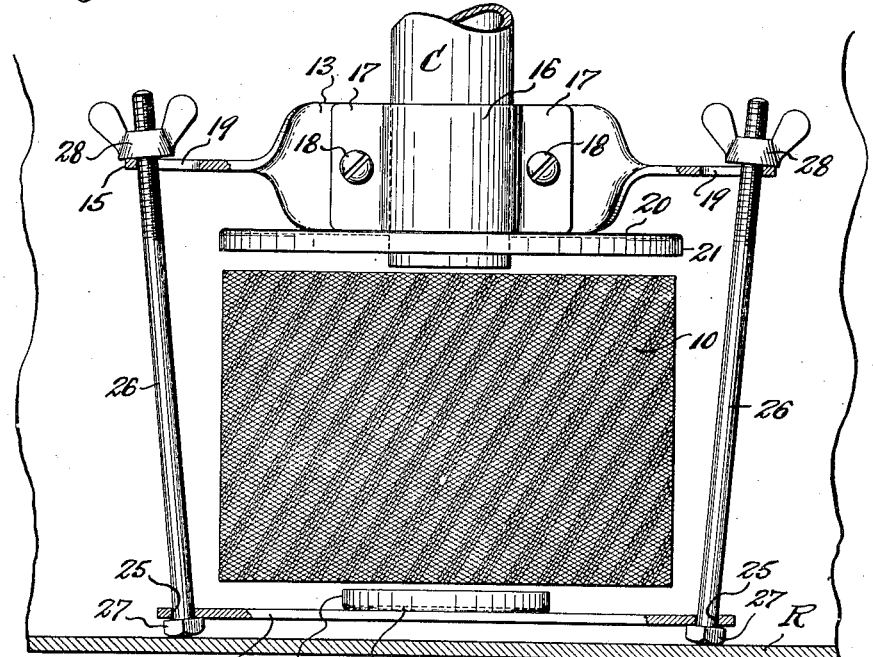
Fig. 4 is a view similar to that of Fig. 1, but showing the supporting harness disposed to release the strainer body for removal therefrom, subject to cleaning and/or replacement.

After a period of use, it may be desirable to remove the strainer body for cleansing and/or replacement. This may be easily accomplished without dismantling the supporting harness. To release the strainer body under such circumstances, the nuts 28 are relaxed whereby to lower the tie-rods 26 and the clamp bar 22 and closure member 23 sufficiently to permit the upper end of the strainer body to withdraw from and clear the seating plate 20, and the joint flange 24 of the closure member 23 to withdraw from the lower end of the strainer body, thereupon swinging outward the tie-rods 26 to the outer ends of the slots 19 of the cross-head hanger arm portions 15, whereby to give better access to the released strainer body 10 for removal thereof (see Fig. 4).

We are aware that various changes could be made in the above described constructions, and that widely different embodiments of this invention could be made without departing from the scope thereof as defined by the herefollowing claims. It is therefore intended that all matter contained in the above description and shown in the accompanying drawings shall be interpreted as illustrative and not in a limiting sense.

We claim:

1. In combination, a foraminous strainer body adapted to be submerged in liquid desired to be passed therethrough, said strainer body having an axial endwise open discharge passage, and a harness means for suspending said strainer body from the intake end portion of a discharge conduit adapted to be immersed in said liquid, said harness means comprising a cross-head having clamp yoke means to affix the same to said conduit and hanger arm portions oppositely extending from said clamp yoke means, means to hold the upper end of said strainer body with its discharge passage in communication with said conduit, a supporting means to engage the lower end of said strainer body including means to close the lower end of the discharge passage of said body, tie rods engaged with opposite end portions of said supporting means for upward extension therefrom through said hanger arm portions of the cross-head, free end portions of said tie-rods being screw-threaded, and fastening nuts on said threaded portions of said tie-rods to abut said hanger arm portions.

2. The combination defined in claim 1 wherein the means to close the lower end of the strainer body discharge passage is provided with an upstanding peripheral flange adapted to be imbedded in the mass of said body for the purposes described.

LOUIS A. KISCH.
EDWARD J. HERTER, Jr.